Figure 4:
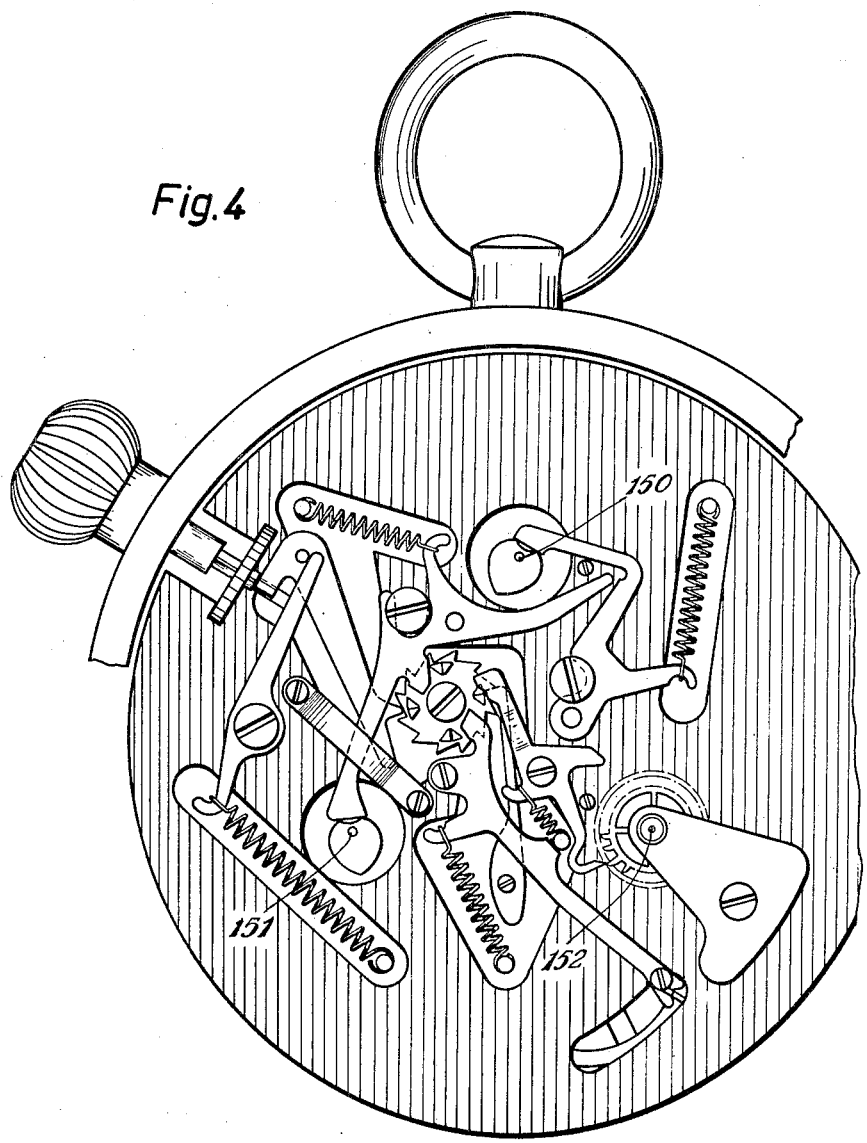

Feb. 19, 1963  H. SCHLENKER  3,077,729
STOP WATCH
Filed March 8, 1960  2 Sheets-Sheet 1
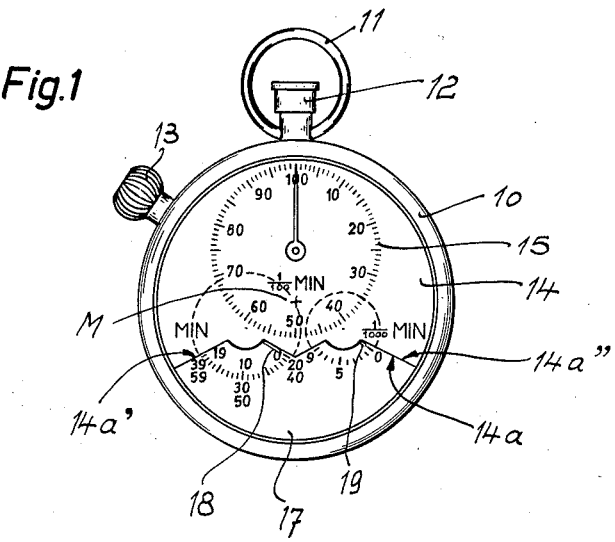
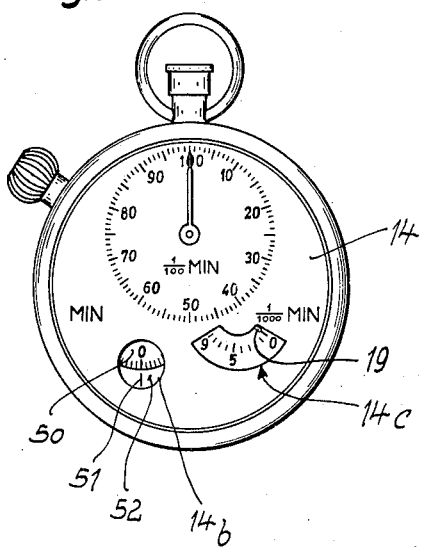
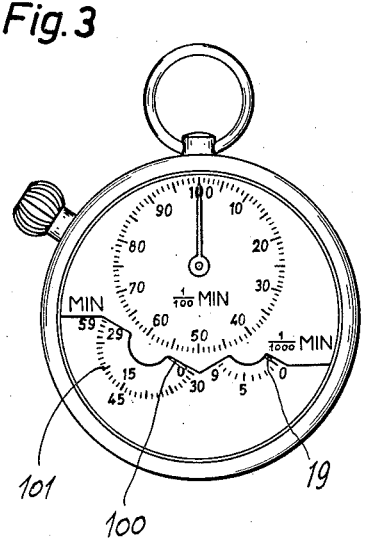
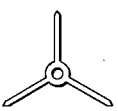
INVENTOR.
HANS SCHLENKER
BY Watson, Cole, Grindle v Watson
ATTORNEYS Feb. 19, 1963 H. SCHLENKER 3,077,729
STOP WATCH
Filed March 8, 1960 2 Sheets-Sheet 2

INVENTOR.
Hans Schlenker
BY
Watson, Cole, Grindle & Watson
ATTORNEYS

United States Patent Office 3,077,729
Patented Feb. 19, 1963

3,077,729
STOP WATCH
Hans Schlenker, Schramberg, Wurttemberg, Germany, assignor to Gebruder Junghans A.G., Schramberg, Wurttemberg, Germany
Filed Mar. 8, 1960, Ser. No. 13,682
1 Claim. (Cl. 58—126)

The present invention relates to stop watches, more particularly pocket stop watches for the measurment of whole minutes, 1/100 of a minute and 1/1000 of a minute. A main object of the invention is to provide a stop watch from which 1/100 of a minute can be read off as easily as possible.

According to the present invention there is provided a stop watch, having decimal graduations provided by three circular or part circular scales arranged eccentrically within the watch case and graduated in minutes, 1/100 of a minute and 1/1000 of a minute respectively, wherein the 1/100 scale is circular and of a diameter larger than the radius of the front opening in the watch case, and at least one of the other scales is part circular and co-operates with a pointer having at least two arms.

Further features and advantages of the invention will become apparent from the following description of several embodiments taken together with the accompanying drawings, in which, FIG. 1 shows a front view of a first embodiment of a stop watch of the invention, FIG. 2 shows a view similar to FIG. 1 of a second embodiment of a stop watch of the invention, FIG. 3 shows a view similar to FIGS. 1 and 2 of a third embodiment of a stop watch of the invention, FIG. 4 is a plan view, on a greatly enlarged scale, and with the dial removed, of the movement used in the embodiments of FIGS. 1 to 3, and FIG. 5 is a plan view, on enlarged scale, of a three-arm pointer.

In the first embodiment (FIG. 1), the watch case is designated as 10, the bow as 11, the start-stop button as 12 and the winding crown as 13. A dial 14 comprises at its upper portion a scale 15 graduated in 1/100 of a minute and arranged as a circular scale extending above the movement centre M. An associated pointer is designated as 16. The scale 15 is given a diameter which is approximately 25% larger than the radius of the dial 14, and thus the spacing between the graduations of the scale is wide enough for easy reading.

At its lower edge 14a the dial 14 is provided with recesses which reveal a second dial 17. Visible below the dial recess 14a', which is provided for whole minutes, is a sector scale graduated in minutes from 0 to 19, 20 to 39 and 40 to 59. Associated therewith is a three-arm pointer 18 only one arm of which is shown above the number "0" (also 20 and 40). In order to facilitate correct addition, for example the pointer arm 18 shown in the drawing may be coloured black together with the numbers "0," "10," "19." The pointer arm which follows next during movement in the clockwise direction (not shown in the drawing) may be coloured red and likewise the associated numbers "20," "30" and "39" on the sector scale for whole minutes; the next following pointer arm may be blue and the numbers "40," "50" and "59" can then be the same colour. Shown below the dial recess 14a" graduated in 1/1000 of a minute is a sector scale extending over 120° and revealing 9 graduations. This scale co-operates with a pointer 19 which also comprises three arms.

The second embodiment (FIG. 2) differs from the first in that the minute counter is a numbered rotating disc 50 which is concealed behind the dial 14 and is partly visible through a window 14b. The position of the numbered disc 50 is read off with respect to a marking 51 on a plate 52 which is situated below the dial 14 and below the numbered disc 50. The sector scale for 1/1000 of a minute is also situated behind a window 14c in the dial 14 and with this scale associated is a three-arm pointer 19 just as in FIGS. 1 and 2. Otherwise the construction of this scale and the associated pointer is the same as in the first embodiment.

The third embodiment (FIG. 3) differs from the first in that a two-part pointer 100 with the arms spaced 180° from each other is provided above the scale 101 for whole minutes. This scale is laid over 180° and graduated from 0 to 29 and from 30 to 59, and in this way visibility and legibility are facilitated since stopping times of more than 30 minutes are rare in the use of stop watches with decimal graduation. Here also, the pointer arms and the associated numbers of the sector scale are differently coloured in order to avoid adding errors, i.e. one pointer arm has one color corresponding to the numerals from 0–29 and the other another color corresponding to that of the numerals from 30–59.

FIG. 4 shows a front view of a movement such as, with slight modifications, has already been used hitherto by the applicant company for pocket stop watches having three eccentric scales for whole minutes, whole seconds and 1/10 of a second, and is described in the copending application Serial No. 691,261 filed October 10, 1957. Whereas in the commercially obtainable construction the shaft designated as 150 carries the second pointer and the associated scale is situated in the right-hand upper half of the dial, in the present example the movement is turned in the counter-clockwise direction relatively to the case so far that the shaft 150 lies on the line connecting the bow and the centre of the movement. This necessitates separating the bow and the crown from one another, so that the latter is situated laterally of the bow. By turning the movement relatively to the bow the shaft 151, which, in the commercially obtainable construction, is situated together with the shaft 150 approximately on a common transverse line, is moved into the lower half of the dial and is now situated approximately on a common transverse line with the shaft 152. The shaft 151 also carries the minute pointer in the construction according to the present invention, whereas the shaft 152 is now associated not with a scale having 1/10 of a second but a scale graduated to indicate 1/1000 of a minute. In order to allocate the pointer for 1/100 of a minute as large a dial diameter as possible, it is merely necessary to shift the shaft 150 rather more towards the centre of the movement as compared with the known movement construction, which presents no difficulty from the constructional point of view.

I claim:
A stop watch comprising a circular case with an open- ing therein, three pointer shafts and scales for a complete minute, a 1/100 of a minute scale and a 1/1000 of a minute scale, a dial on which the 1/100 minute scale is provided and the scale for the 1/100 minute comprising a complete circle the diameter of which is greater than one half of the diameter of the opening in the case, the dial on which the 1/100 scale is provided having an opening therein below the 1/100 scale, a second dial below and spaced from the first-mentioned dial and having a complete minute scale and a 1/1000 minute scale thereon, and pointers on the shafts one for each scale with the pointer for the 1/100 of a minute scale being above the first-mentioned dial and the other two pointers being provided in the space between the two dials, the projections of the circular path of travel of the pointers for the scales on the second-mentioned dial sweeping under the first-mentioned dial and partially under the scale thereon.

References Cited in the file of this patent

UNITED STATES PATENTS

| | | |
|---|---|---|
| 1,821,066 | Marmorstein | Sept. 1, 1931 |
| 2,070,087 | McNair | Feb. 9, 1937 |

FOREIGN PATENTS

| | | |
|---|---|---|
| 55,401 | Switzerland | Apr. 12, 1911 |
| 54,495 | Austria | July 25, 1912 |
| 70,173 | Switzerland | Sept. 1, 1915 |
| 82,806 | Switzerland | Oct. 16, 1919 |
| 523,066 | Canada | Mar. 20, 1956 |